United States Patent
Bodner et al.

(10) Patent No.: US 7,721,120 B2
(45) Date of Patent: May 18, 2010

(54) CONTROLLING FAN SPEED IN ELECTRONIC SYSTEM

(75) Inventors: James T. Bodner, Houston, TX (US); Gerald K. Kleyn, Houston, TX (US); David F. Heinrich, Tomball, TX (US); Andrew Brown, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 842 days.

(21) Appl. No.: 11/517,104

(22) Filed: Sep. 7, 2006

(65) Prior Publication Data

US 2008/0065912 A1    Mar. 13, 2008

(51) Int. Cl.
    *G06F 1/00* (2006.01)
(52) U.S. Cl. ........................ 713/300; 700/299; 700/300; 415/47; 361/695
(58) Field of Classification Search ................. 713/300; 700/299, 300; 415/47; 361/695
    See application file for complete search history.

(56) References Cited

U.S. PATENT DOCUMENTS

| | | | |
|---|---|---|---|
| 4,956,795 A * | 9/1990 | Yamaguchi et al. ............ 702/99 |
| 5,723,998 A | 3/1998 | Saito et al. |
| 5,805,403 A * | 9/1998 | Chemla ....................... 361/103 |
| 6,735,499 B2 | 5/2004 | Ohki et al. |
| 7,036,027 B2 | 4/2006 | Kim et al. |
| 7,075,261 B2 | 7/2006 | Burstein |
| 7,167,993 B1 * | 1/2007 | Thomas et al. ............... 713/322 |
| 7,231,474 B1 * | 6/2007 | Helms et al. ................. 710/110 |
| 7,235,943 B2 * | 6/2007 | Hsiang et al. ................ 318/471 |
| 7,237,086 B1 * | 6/2007 | Kothandapani et al. ........ 712/8 |
| 7,310,738 B2 * | 12/2007 | Bhagwath et al. ............ 713/300 |
| 7,343,227 B1 * | 3/2008 | Artman et al. ............... 700/299 |
| 7,418,611 B1 * | 8/2008 | Thomas et al. .............. 713/322 |
| 7,421,615 B2 * | 9/2008 | Yang et al. ..................... 714/11 |
| 7,594,750 B2 * | 9/2009 | Lee et al. ...................... 374/178 |
| 2003/0100959 A1 * | 5/2003 | Liu .............................. 700/21 |
| 2005/0049729 A1 * | 3/2005 | Culbert et al. ................. 700/50 |
| 2005/0268128 A1 * | 12/2005 | Wu et al. ..................... 713/322 |
| 2006/0006246 A1 * | 1/2006 | Kim .......................... 236/49.3 |
| 2006/0108962 A1 | 5/2006 | Murray et al. |
| 2006/0138247 A1 | 6/2006 | Shen et al. |
| 2006/0149422 A1 | 7/2006 | Dunstan et al. |
| 2006/0266510 A1 * | 11/2006 | Nobashi ..................... 165/287 |
| 2006/0268512 A1 * | 11/2006 | Foster, Sr. ................... 361/695 |
| 2007/0076372 A1 * | 4/2007 | Lin ............................. 361/695 |
| 2007/0081800 A1 * | 4/2007 | Hsiang et al. ............... 388/811 |

* cited by examiner

*Primary Examiner*—Thomas Lee
*Assistant Examiner*—Jaweed A Abbaszadeh

(57) ABSTRACT

An electronic system includes a fan and a fan controller connected to the fan to control a speed of the fan. The fan controller has storage locations for storing thermal data used by the fan controller to control the speed of the fan. A thermal sensor generates a first portion of the thermal data, which is readable by the fan controller, and which the fan controller stores in a first portion of the storage locations. A device generates a second portion of the thermal data, which is not readable by the fan controller. An agent writes the second portion of the thermal data to a second portion of the storage locations.

20 Claims, 4 Drawing Sheets

CONTROLLING FAN SPEED IN ELECTRONIC SYSTEM

BACKGROUND

In electronic systems, such as computers and many other devices, there are commonly some components that generate heat during operation. Many of these components need to be cooled to prevent damage to the component or other parts of the electronic system. Cooling also helps to maintain or enhance the operating capability or efficiency of the electronic system. One or more fans are thus employed to move air through the electronic systems and across the heat generating components to transfer the heat to the ambient air. The components are thereby cooled.

It is possible to keep the fans blowing at maximum speed all the time to ensure maximum cooling capacity. However, fans can cause vibrations and audible noise, use significant electricity and can wear out. Therefore, it is preferable to run the fans only as fast as is necessary to achieve sufficient cooling of the heat generating components to maintain proper operation of the overall electronic system. Sensors are, thus, placed in various suitable locations within the electronic system to generate thermal data, which is used to determine the speed needed for the fans.

Some components or devices within the electronic system, however, because of their design and/or location within the electronic system, do not allow for a suitable placement of a sensor. It is, therefore, difficult, expensive or impossible to generate useful thermal data for these components. Additionally, any thermal data that can be generated by an unsuitably placed sensor may not accurately indicate the actual temperature of the components. Without good thermal data, the necessary speed of the fans cannot be optimized. The proper or optimum operation of the electronic system or its components is thus jeopardized.

DETAILED DESCRIPTION

Figure 1:
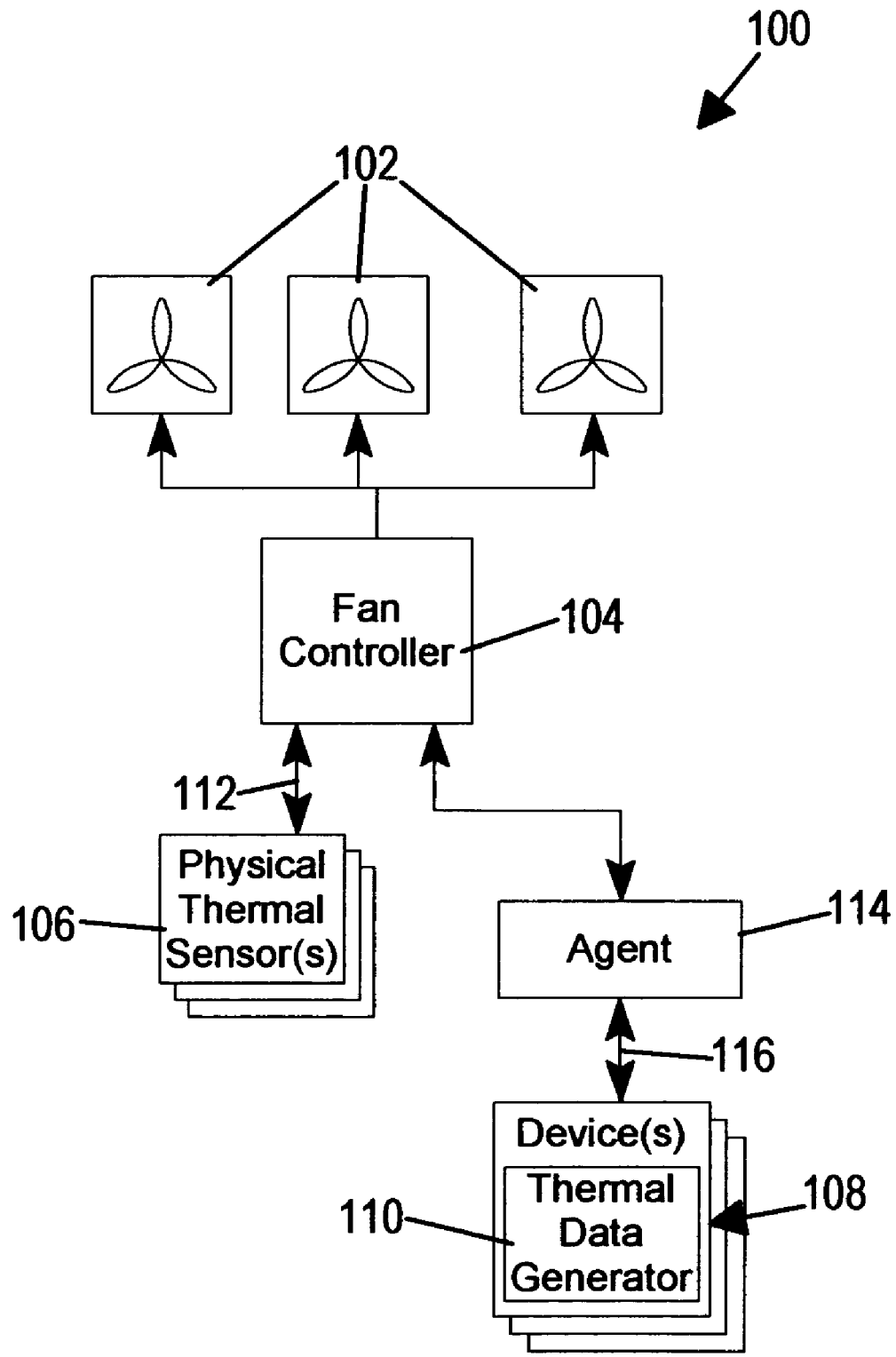
FIG. 1 is a simplified schematic of an exemplary electronic system incorporating an embodiment of the present invention.

An exemplary electronic system 100 incorporating an embodiment of the present invention is shown in FIG. 1 generally having one or more fans 102, a fan controller 104, various physical thermal sensors 106 and a variety of devices 108, among other possible components. Each physical thermal sensor 106 generates thermal data indicative of the temperature thereof.

Each device 108 also has at least one thermal data generator or sensor 110 that generates thermal data indicating a temperature of the device 108 or a component thereof. Such thermal data has heretofore typically been generated by the devices 108 for each device's own internal purposes, such as to prompt the device to reduce its own power consumption or to shut itself off as a failsafe measure to prevent damage to itself or other components due to overheating. Fan controllers, however, have not used the thermal data generated by the thermal data generators 110 of the devices 108 to determine the speed of the fans 102 in an electronic system, because fan controllers have not had access to this thermal data. Additionally, the types of thermal data generators are not all the same and have even changed over time, thereby further rendering it impractical to allow the fan controller 104 to directly access the thermal data generators 110, since it is undesirable to have to redesign the fan controller 104 to account for new or different thermal sensors or thermal data generators. Furthermore, it is often difficult, expensive or impossible to place a physical thermal sensor 106 in, on or near some of the devices 108 for the fan controller 104 to directly access.

Embodiments of the present invention, however, enable the fan controller 104 to receive the thermal data generated in the devices 108. The fan controller 104 then uses this thermal data along with the thermal data generated by the physical thermal sensors 106 to determine the speed of the fans 102.

The fan controller 104 is connected to and in communication with the physical thermal sensors 106 through a data pathway 112, such as a standard I2C (Inter-Integrated Circuit) bus or other appropriate computer bus type. Thus, the fan controller 104 can request and receive the thermal data from the physical thermal sensors 106 through the data pathway 112. The fan controller 104, however, cannot access the thermal data generated by the thermal data generators 110 of the devices 108. According to some embodiments of the present invention, however, an "agent" 114 is capable of accessing the devices 108 to request the generated thermal data through one or more data pathways 116, separate from the data pathway 112. (The data pathway 116 may represent one or more computer buses or communication paths through which commands and/or data may pass within the electronic system 100.) Upon receiving the generated thermal data from the devices 108, the agent 114 then writes the thermal data to the fan controller 104. Thus, the fan controller 104 is able to use both the thermal data generated by the physical thermal sensors 106 and the thermal data generated within the devices 108 to determine the speed of the fans 102.

Figure 2:
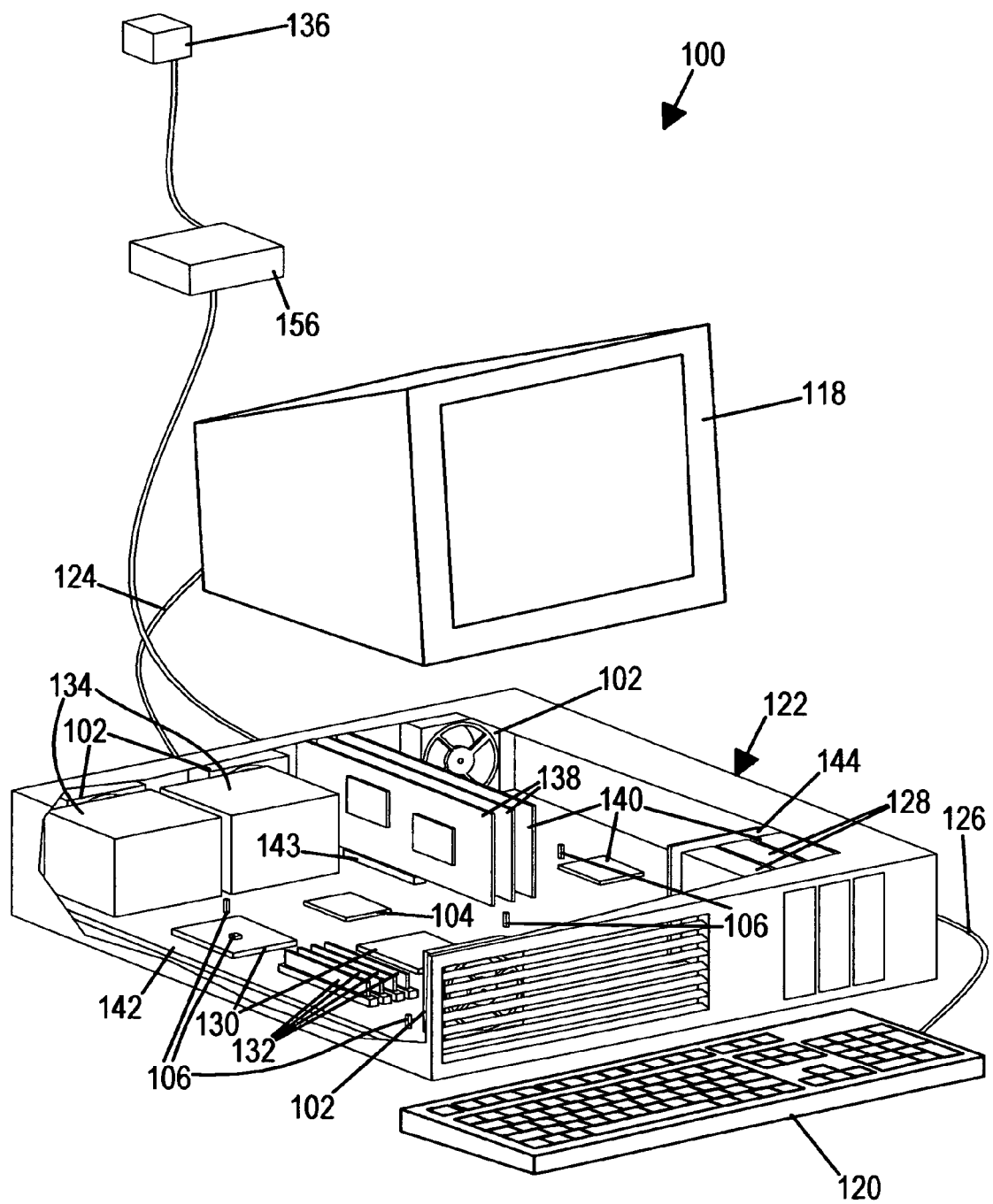
FIG. 2 is a perspective view of the exemplary electronic system shown in FIG. 1 incorporating an embodiment of the present invention.
Figure 3:
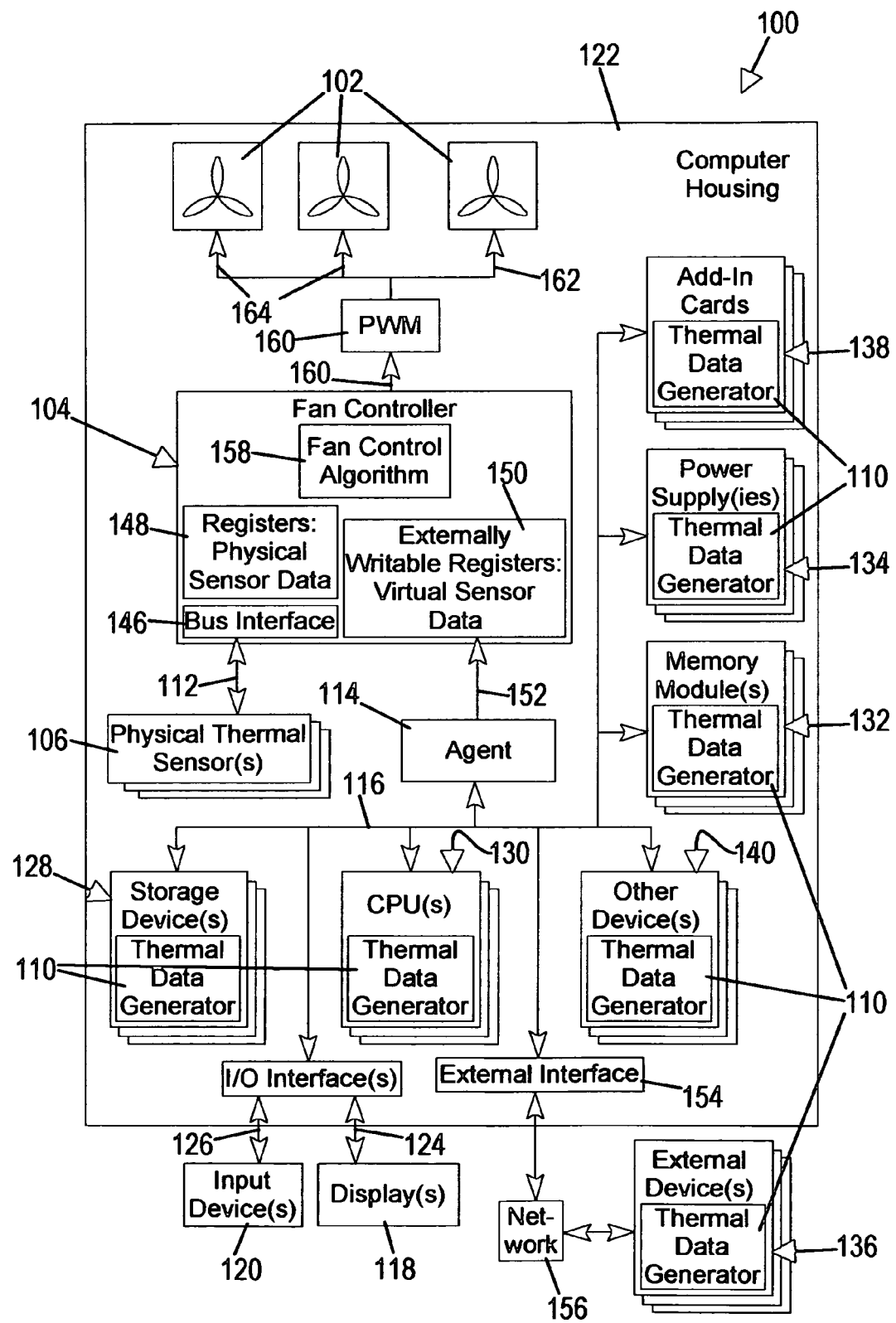
FIG. 3 is a more detailed simplified schematic of the exemplary electronic system shown in FIG. 1 incorporating an embodiment of the present invention.

For purposes of this description, the electronic system 100 is shown as a computer system. The electronic system 100, however, may be any appropriate electronic device or combination of electronic devices (e.g. a computer server, a rack-based computerized device, a DVD player/recorder, a television, etc.) having some or all of the features and functions described herein. For this example, the electronic system 100 generally includes one or more optional displays 118, one or more optional input devices (e.g. a keyboard and/or pointing device) 120 and a computer housing 122 connected together by cables 124 and 126, as shown in FIGS. 2 and 3. The interior of the housing 122 generally contains various combinations of electrical and mechanical components, such as one or more of the fans 102, the fan controller 104, one or more of the physical thermal sensors 106 and one or more of the devices 108 (FIG. 1). Such devices 108 may include computer peripheral devices, storage devices 128, CPUs 130, memory modules 132, power supplies 134, external devices 136 and add-in cards 138, among other possible devices 140. Additionally, the interior of the housing 122 may contain a variety of other electrical and mechanical components, such as a system printed circuit board (PCB) 142. The devices 108 (128-140) typically connect to the system PCB 142 via a direct mounting, edge connectors (e.g. 143), cables, wires, a backplane 144, or other appropriate means through which transmissions of the data pathway 116 pass.

Generally, the fan controller 104 is capable of ramping up the speed of one or more of the fans 102 when a temperature sensed reaches a given value based on the thermal data. On the other hand, the fan controller 104 is also capable of ramping down the speed of one or more of the fans 102 when the thermal data indicates that the sensed temperature at one or more location has fallen below a given value. The fan controller 104 thus has certain information, such as a temperature at which to start one or more of the fans 102, a temperature at which to stop one or more of the fans 102 and how to increase/decrease the speed of one or more of the fans 102 over the stop/start temperature range.

According to various embodiments, the fan controller 104 is based in software, hardware or a combination thereof. In a primarily software based solution, the fan controller 104 may be a program running on a general purpose processor that performs the functions described herein. In some embodiments involving a primarily hardware based solution, the fan controller 104 is, or is part of, an ASIC (application specific integrated circuit) that performs these functions. The fan controller 104 may thus be part of an overall "hardware monitoring block."

The physical thermal sensors 106 are placed within the housing 122 at a variety of desired locations. Some of the physical thermal sensors 106 are shown mounted on the system PCB 142 and sticking up generally to take the temperature of the air inside the housing 122. Another physical thermal sensor 106 is shown mounted (e.g. by glue, solder, etc.) on one of the components (e.g. one of the CPUs 130) specifically to take the temperature of the component. Other appropriate locations within the electronic system 100 may include any placement where space is available and access through the data pathway 112 is possible.

The agent 114 is preferably a programmable device that operates independently from the fan controller 104. For example, the agent 114 may be a system ROM (read only memory) operating from one of the CPUs 130 or a driver running under an operating system. Alternatively, a "base management controller" (BMC) of the electronic system 100 may serve as the agent 114.

According to various embodiments, the fan controller 104 has a bus interface 146 (FIG. 3) to the data pathway 112. The fan controller 104 also has, or has access to, storage locations or "scratchpad" registers, such as physical thermal sensor data registers 148 and externally writable "virtual" sensor data registers 150. The fan controller 104 can write into the registers 148, but not into the other registers 150. To write data into the registers 148, the fan controller 104 sends a request for the thermal data to the physical thermal sensors 106 through the bus interface 146 and the data pathway 112. The physical thermal sensors 106 respond by transmitting the thermal data back through the data pathway 112 to the fan controller 104. The fan controller 104 stores the received physical thermal sensor data in the registers 148. In this manner, the fan controller 104 directly accesses and stores the thermal data from the physical thermal sensors 106.

The various devices 108 (128-140) typically, though not necessarily, do not have an interface to the data pathway 112. (Communications with the devices 108, 128-140 are typically limited by the connection means between the devices 108, 128-140 and the rest of the electronic system 100.) The fan controller 104, therefore, cannot request the thermal data directly from the devices 108 (128-140). Instead, the agent 114 sends a request for the thermal data to the devices 108 (128-140) through the data pathway 116. In response, the devices 108 (128-140) transmit the thermal data generated therein back to the agent 114. The agent 114 then writes the received thermal data to the registers 150 through an appropriate communication path 152. (In some embodiments, the communication path 152 is the data pathway 112.)

Additionally, to access the external devices 136, the agent 114 directs the request through the data pathway 116, an external interface (e.g. a network interface) 154 and an external communication path (e.g. a network) 156 to the external devices 136. The external devices 136 may include thermal sensors, thermostats or other temperature-related devices outside the housing 122. In this manner, the fan controller 104 can take into consideration factors that are external to the housing 122, e.g. ambient air temperature in a room in which the electronic system 100 is located.

According to some embodiments, the fan controller 104 treats all of the thermal data in the registers 148 and 150 as having been generated by thermal sensors. The term "virtual" is applied to the thermal data in the registers 150, since the data therein does not actually come directly from physical thermal sensors, as does the thermal data in the registers 148, but must be acquired by the agent 114 before being written into the registers 150. Nevertheless, the fan controller 104 does not need to distinguish the thermal data by the manner in which it was collected into the registers 148 and 150.

The fan controller 104 uses the thermal data contained in the registers 148 and 150 in a fan control algorithm 158. The fan control algorithm 158 determines the desired speed of, or input power for, the fans 102 based on the thermal data. Based on this determination, the fan controller 104 outputs one or more signals 160. A pulse width modulator (PWM) 162 receives the signal(s) 160 and outputs one or more power signals 164 based on the signal(s) 160. The power signals 164 provide power to the fans 102. The power signals 164 may all be the same, so the fans 102 run at the same speed. Alternatively, the power signals 164 may be generated independently of each other, so the fans 102 may run at different speeds, depending on the need for air movement, or cooling, in different parts of the housing 122.

Figure 4:
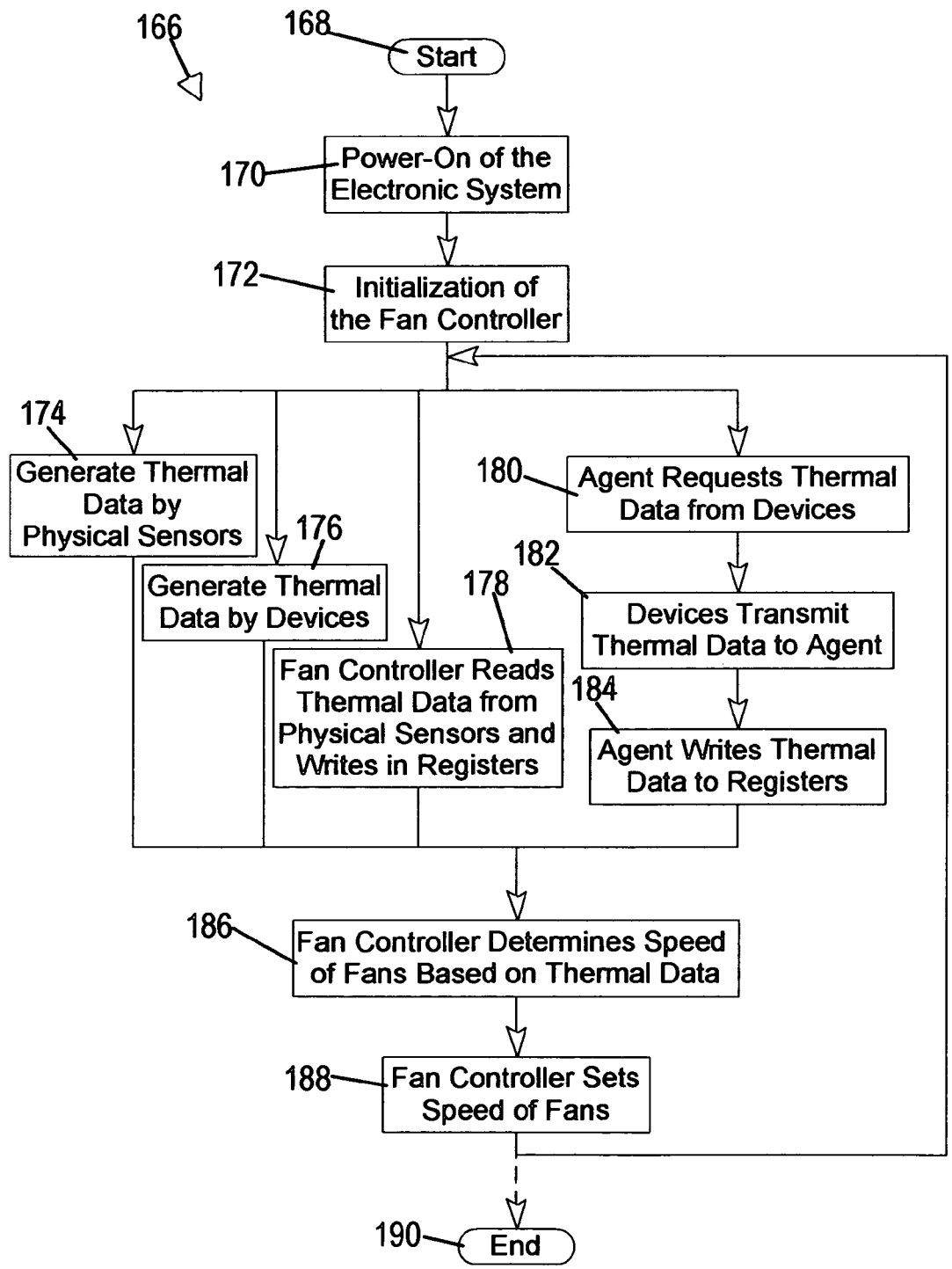
FIG. 4 is a flow chart of a procedure for controlling fan speed in the exemplary electronic system shown in FIG. 1 according to an embodiment of the present invention.

An exemplary procedure 166 for the electronic system 100 to gather the thermal data and set the speed of the fans 102 is shown in FIG. 4 according to an embodiment of the present invention. The order and descriptions of some of the actions 168-190 may vary according to various embodiments. The procedure 166 starts (at 168) with power-up (at 170) of the electronic system 100. At 172, the fan controller 104 is initialized for operation, e.g. by the system ROM or the agent 114. In this initialization, the limits (i.e. temperature thresholds) at which the speed of the fans 102 are to be changed and the rate at which the speeds are to be increased or decreased, among other appropriate parameters, are programmed into the fan controller 104. The physical thermal sensors 106 begin to generate (at 174) their portion of the thermal data. The physical thermal sensors 106 generally perform this task continuously while powered on. The devices 108 (128-140) begin to generate (at 176) their portion of the thermal data. The devices 108 (128-140) generally perform this task continuously, or as required, while powered on for their own internal purposes. The fan controller 104 reads/requests (at 178) the thermal data from the physical thermal sensors 106 and writes/stores this data in the registers 148. The agent 114 begins operation and starts to request (at 180) the thermal data from the devices 108 (128-140). Upon receipt of such a request, the devices 108 (128-140) respond by transmitting (at 182) the requested thermal data back to the agent 114. Upon receipt of the thermal data, the agent 114 writes (at 184) the thermal data into the registers 150. (Optionally, before writing the thermal data into the registers 150, the agent 114 may perform error corrections on the thermal data to account for known inaccuracies in the thermal data.) The actions at 174, 176 and 178 are shown being performed in parallel with each other and with the actions at 180-184 because the fan controller 104, the physical thermal sensors 106, the devices 108 and the agent 114 preferably operate at the same time independently and asynchronously of each other. The fan controller 104 reads the thermal data from the registers 148 and 150 and uses the fan control algorithm 158 to determine (at 186) the speed for the fans 102 based on the thermal data. The fan controller 104 then sets (at 188) the speed of the fans 102 by generating the signal(s) 160, supplied to the PWM 162. The procedure 166 either ends (at 190) or returns to 174 to continue monitoring the thermal data in order to update the speed of the fans 102 periodically.

We claim:

1. An electronic system comprising:
   a fan;
   a fan controller connected to the fan to control a speed of the fan, and
   having storage locations for storing thermal data used by the fan controller to control the speed of the fan;
   a thermal sensor that generates a first portion of the thermal data, which is readable by the fan controller, and which the fan controller stores in a first portion of the storage locations;
   a device that generates a second portion of the thermal data, which is not readable by the fan controller; and
   an agent in active communication with the fan controller to write the second portion of the thermal data to a second portion of the storage locations.

2. An electronic system as defined in claim 1, further comprising:
   a first computer bus, through which the fan controller accesses the thermal sensor to obtain the first portion of the thermal data; and
   a second computer bus, through which the agent is in communication with the device to receive the second portion of the thermal data.

3. An electronic system as defined in claim 1, further comprising:
   a computer bus, through which the agent is in communication with the device to receive the second portion of the thermal data;
   and wherein:
   the agent transmits through the computer bus to the device a request for the second portion of the thermal data; and
   the device transmits through the computer bus to the agent the second portion of the thermal data in response to the request.

4. An electronic system as defined in claim 3, wherein:
   the agent is a computer central processing unit in communication with the device via the computer bus to transmit commands and data between the computer central processing unit and the device.

5. An electronic system as defined in claim 3, further comprising:
   a system printed circuit board on which the agent is mounted;
   and wherein:
   the device is a computer peripheral device spaced apart from the system printed circuit board and electronically connected with the system printed circuit board via a backplane through which transmissions on the computer bus pass.

6. An electronic system as defined in claim 3, further comprising:
   a system printed circuit board on which the agent and a card connector are mounted;
   and wherein:
   the device is a computer peripheral device on a card inserted into the card connector on the system printed circuit board and electronically connected with the system printed circuit board via the card connector through which transmissions on the computer bus pass.

7. An electronic system as defined in claim 1, further comprising:
   a communication network, through which the agent can communicate with the device to receive the second portion of the thermal data;
   and wherein:
   the agent transmits through the communication network to the device a request for the second portion of the thermal data; and
   the device transmits through the communication network to the agent the second portion of the thermal data in response to the request.

8. An electronic system as defined in claim 7, further comprising:
   a housing within which the fan, the fan controller, the thermal sensor, and the agent are disposed;
   and wherein the device is disposed externally to the housing.

9. An electronic system as defined in claim 1, wherein:
   the agent is the device.

10. An electronic system as defined in claim 9, wherein:
    the agent and the device are a central processing unit of the electronic system.

11. An electronic system as defined in claim 1, further comprising:
    a plurality of the fan;
    and wherein the fan controller controls the speed of each fan independently based on thermal data.

12. A fan control system for use in an electronic system having a fan, comprising:
    a fan controller connected to the fan to control a speed of the fan, and having first and second storage locations for storing first and second thermal data used by the fan controller to control the speed of the fan;
    a thermal sensor that generates the first thermal data, which is readable by the fan controller, and which the fan controller stores in the first storage location; and
    an agent in communication with the fan controller to write the second thermal data to the second storage location, the second thermal data, which is generated by a device, not readable by the fan controller.

13. A fan control system as defined in claim 12, further comprising:
    an interface to a first computer bus, through which the fan controller can communicate with the thermal sensor to obtain the first thermal data;
    and wherein the agent obtains the second thermal data through a second computer bus, different from the first computer bus, from a device that generates the second thermal data.

14. A fan control system as defined in claim 12, wherein:
    the agent generates the second thermal data.

15. A fan control system as defined in claim 12, wherein:
    the agent obtains the second thermal data through a computer network, from a device that generates the second thermal data.

16. A fan controller for use in an electronic system having a fan, comprising:

a first storage location into which the fan controller can store first thermal data; and a second storage location into which an external agent can write second thermal data, which is generated by a device, not readable by the fan controller;

and wherein the fan controller uses the first and second thermal data to determine a speed for the fan.

17. A fan controller as defined in claim 16, further comprising:

an interface to a first computer bus, through which the fan controller can communicate with a thermal sensor to obtain the first thermal data;

and wherein the external agent obtains the second thermal data through a second computer bus, different from the first computer bus, from a device that generates the second thermal data.

18. An electronic system comprising:

a means for moving air;

a means for storing first and second thermal data;

a means for controlling a speed of the air moving means based on the stored first and second thermal data;

a means for generating the first thermal data;

a means for the controlling means to request the first thermal data from the generating means thereof and to store the first thermal data in the storing means;

a means for generating the second thermal data, which is not readable by the controlling means; and a means, separate from the controlling means, for reading the second thermal data from the generating means thereof and writing the second thermal data to the storing means.

19. A method of controlling a fan in an electronic system comprising:

generating first thermal data that is accessible by a fan controller;

storing, by the fan controller, the first thermal data in a first storage location;

generating second thermal data that is inaccessible by the fan controller;

storing, by an agent separate from the fan controller, the second thermal data in a second storage location that is accessible by the fan controller; and determining, by the fan controller, a speed of the fan based on the first and second thermal data.

20. A method as defined in claim 19, further comprising:

accessing, by the fan controller, the first thermal data via a first data pathway; and accessing, by the agent, the second thermal data via a second data pathway that is inaccessible by the fan controller.

* * * * *

UNITED STATES PATENT AND TRADEMARK OFFICE
CERTIFICATE OF CORRECTION

PATENT NO. : 7,721,120 B2 Page 1 of 1
APPLICATION NO. : 11/517104
DATED : May 18, 2010
INVENTOR(S) : James T. Bodner et al.

It is certified that error appears in the above-identified patent and that said Letters Patent is hereby corrected as shown below:

In column 5, lines 18-21, in Claim 1,
delete "a fan controller connected to the fan to control a speed of the fan, and
having storage locations for storing thermal data used by the fan controller to control the speed of the fan;" and
insert -- a fan controller connected to the fan to control a speed of the fan, and having storage locations for storing thermal data used by the fan controller to control the speed of the fan; --, therefor.

Signed and Sealed this

Thirty-first Day of August, 2010

David J. Kappos
*Director of the United States Patent and Trademark Office*